United States Patent [19]

Neilson et al.

[11] Patent Number: 5,657,857
[45] Date of Patent: Aug. 19, 1997

[54] PIVOTAL IDLER FRAME ASSEMBLY FOR CONVEYERS

[76] Inventors: Marvin C. Neilson, P.O. Box 1445, Carlin, Nev. 89822; Norman A. Whittaker, 735 S. Alpine Dr., Elko, Nev. 89801

[21] Appl. No.: 526,430

[22] Filed: Sep. 11, 1995

[51] Int. Cl.$^6$ .................................................. B65G 21/00
[52] U.S. Cl. ..................................... 198/861.1; 198/860.1; 198/828; 198/830; 193/35 R
[58] Field of Search ................. 198/861.1, 860.1, 198/828, 830; 193/35 R

[56] References Cited

U.S. PATENT DOCUMENTS

| | | | |
|---|---|---|---|
| 2,974,777 | 3/1961 | Marsh | 198/830 |
| 3,263,951 | 8/1966 | Stokes | 198/861.1 |
| 3,340,036 | 9/1967 | Dryon | 193/37 |
| 3,664,488 | 5/1972 | Florian et al. | 198/842 |
| 4,911,279 | 3/1990 | Thunissen | 193/35 SS |
| 4,978,000 | 12/1990 | Mohr | 198/842 |
| 5,076,412 | 12/1991 | Huber | 193/35 |
| 5,506,642 | 4/1996 | Highsmith | 193/35 |

FOREIGN PATENT DOCUMENTS

| | | | |
|---|---|---|---|
| 1218772 | 5/1960 | France | 198/828 |
| 1146248 | 3/1985 | U.S.S.R. | 198/828 |
| 2 207 408 | 2/1989 | United Kingdom | 198/830 |

Primary Examiner—William E. Terrell
Assistant Examiner—Khoi H. Tran
Attorney, Agent, or Firm—Broadbent, Hulse, Pierce and Pate

[57] ABSTRACT

A pivotal idler frame assembly for conveyors is disclosed in one preferred embodiment of the present invention as including an idler frame assembly selectively disposed in a pivotal relationship to a stationary conveyor frame. The idler frame assembly consists of a hinge member rotatably engaging at least two fixation members of the idler frame assembly and at least two support flanges of the conveyor frame which are correspondingly disposed in alignment with the fixation members. By releasing the operable engagement of a stabilizer member, the idler frame assembly may be pivoted in relation to the conveyor frame to remove the rollers of the idler frame from communication with a moving member. In addition, the structural hinge member provides means for slideably removing the idler frame assembly from beneath the moving member and adjacent the conveyor frame to expose the rollers of the idler frame assembly for dismounting and mounting.

18 Claims, 3 Drawing Sheets

PIVOTAL IDLER FRAME ASSEMBLY FOR CONVEYERS

BACKGROUND

1. The Field of the Invention

This invention relates to conveyor assemblies and, more particularly, to novel systems and methods for providing an idler frame having a pivotal assembly and a selectively slidable member for exposing the rollers of the idler frame for repair or replacement.

2. The Background Art

Traditionally, materials-handling conveyor assemblies were developed by those skilled in the art for moving individual articles, such as solids, or free-flowing bulk materials (packed, unpacked or loose) over a horizontal, inclined, declined or vertical path of travel using continuous motion or movement. In particular, conveyor assemblies were designed for, but not limited to, situation in which: (1) the load to be transported was uniform and the total load was generally constant; (2) continuous movement at relatively fixed speeds was desirable; and (3) the path to be traveled was normally fixed. Correspondingly, materials-handling conveyor assemblies of the prior art typically incorporate a variety of apparatus or devices which provide mechanical movement of materials from place to place as, for example, an endless moving conveyor belt or a chain of receptacles.

Traditionally, conveyor assemblies have been used in multiple industrial applications, in warehouse and freight-handling, and in the movement of raw materials. Moreover, materials-handling machineries have been used throughout various industries in nearly every phase of production and distribution consistent with the ability to promote economy while facilitating a controlled and continuous flow of materials. In fact, many industries depend on materials-handling conveyor assemblies for their very existence.

For example, the mining industry is nearly 90% materials-handling dependent; the construction industry is roughly 90% materials-handling dependent; and, in a typical industrial manufacturing setting, approximately 50% to 75% of the overall production costs are directly related to materials-handling (an exact amount would depend upon the nature of the processes and products). In view thereof, prior art conveyor assemblies have become a symbol of industrial mass production.

Several types of conveyor assemblies have been developed by those skilled in the art to accommodate a diversity of tasks. In choosing a conveyor assembly for a particular job, primary considerations should be carefully considered, such as the characteristics of the objects(s) or materials to be handled, the distance and nature of the move to be made, and the inherent limitations or restrictions of any building or structural impediment.

One of the simplest kinds of prior art materials-handling conveyor assemblies operates using gravity or manual power (such as, chutes, roller conveyors and/or wheel conveyors, etc.) to propel objects or materials from one point to another. Other types of prior art conveyor assemblies typically use a power source and employ a belt, chain or cable to provide continuous movement. A representative group of powered prior art materials-handling conveyor assemblies may include, for example, belt conveyors, vibrating conveyors or slat conveyors.

Prior art belt conveyors consist essentially of a belt of fabric, rubber, plastic, leather or metal forming a continuous loop and supported by one or more idler frames. Customarily, prior art conveyor belt assemblies are powered by an electric motor and comprise a drive pulley which supplies motion to the conveyor belt to keep the belt moving. In design, prior art conveyor belts are generally supported by an idler frame consisting of a series of rollers or a flat slider bed to reduce friction and provide support to the conveyor belt. Conveyor belt assemblies of the prior art may also be formed having an idler frame assembly arranged so as to provide rollers which form a structural basis for a trough to facilitate maximum carrying capacity and economy of the objects or materials being moved.

Similarly, vibrating conveyor assemblies of the prior art may be designed having a trough flexibly supported by one or more idler frames which can be vibrated at a relatively high frequency and small amplitude to convey a forward motion of the bulk materials or other objects within the trough. This vibratory motion or movement typically advances the materials along the path defined by the conveyor belt. For example, one type of prior art vibrating conveyor includes an oscillating assembly which uses a relatively low frequency and a large amplitude to initiate movement of the materials on the conveyor belt.

As further characterized by the variety of powered conveyor assemblies, slat conveyor assemblies of the prior art typically consist of endless chains that are driven by electric motors which operate through reduction gears and sprockets. In addition, slat conveyor assemblies of the prior art are generally formed having spaced slats to carry objects or materials which may damage a conveyor belt because of their sharp edges or heavy weights.

In addition to the prior art conveyor assemblies outlined above, other materials-handling conveyor assemblies have been developed by those skilled in the art which utilize apparatus and devices for reciprocating jerking motions, suction and magnetic holders, forming carriers and other conventional principles and mechanisms. While conveyor assemblies of the prior art provide significant industrial advantages when moving objects or materials from place to place, several disadvantages exists when attempting to provide maintenance or repair to these assemblies.

For example, the methods and techniques used to service rollers of an idler frame of prior art materials-handling conveyors are generally underdeveloped despite the pressures from industry for labor economy and safety. In this regard, the current methods employed by those skilled in the art to mount or dismount rollers of prior art conveyor assemblies typically require two to three hours of labor and several working technicians to complete. In many instances, prior art conveyor assemblies are set high above the ground and are only partially accessible by an adjacent catwalk. To repair or replace one or more existing rollers of an idler frame, technicians must typically leave the convenience and safety of an adjacent catwalk and attempt to carefully position themselves on the side of the idler frame opposite the catwalk in order to remove the locking members disposed to retain the rollers mounted on the idler frame, thus creating the potential hazard of a technician falling from the suspended conveyor assembly.

Another disadvantage of prior art methods and techniques for mounting or dismounting rollers of an idler frame from prior art conveyor assemblies involves the possible danger of serious injury associated with having to physically lift and support the weight of a typical conveyor belt (and the objects or materials resting thereon) from its contact with the rollers of an idler frame in order to repair or replace one or more of the rollers. Corresponding to the general weight of a conveyor belt, during the lifting process, those technicians providing the labor for lifting the conveyor belt may sustain serious back injuries or other significant injuries if the bracing means supporting the conveyor belt were to give way under the force of the conveyor belt while technicians were working thereunder. Similarly, because the safety guards of prior art conveyor assembly are generally removed completely from the conveyor belt in order to service the rollers of the idler frame, an accidental start of the conveyor assembly could easily result in meaningful injuries to any or all of the technicians servicing the conveyor assembly.

Considering all these factors, the methods and techniques for servicing materials-handling conveyor assemblies of the prior art have proven to involve a substantial investment of time and labor, while creating substandard safety protocols. In accordance therewith, it would be desirable to provide an idler frame assembly for conveyors which accommodates the above-identified disadvantages.

BRIEF SUMMARY AND OBJECTS OF THE INVENTION

In view of the foregoing, it is a primary object of the present invention to provide an idler frame assembly for conveyors having a hinge mechanism which is capable of providing means for pivotally displacing the idler frame and its rollers from contact with a conveyor belt in order to repair or replace one or more of the rollers of the idler frame.

It is also an object of the present invention to provide a pivotal idler frame assembly for conveyors having a hinge member which is capable of providing means for sliding the idler frame from beneath the conveyor belt and for simultaneously exposing one or more rollers of the idler frame on an accessible side of the conveyor frame for mounting or dismounting.

It is a further object of the present invention to provide a pivotal idler frame assembly for conveyors which substantially reduces the time and labor involved to repair or replace one or more rollers of an idler frame assembly, while maintaining meaningful safety standards and protocols.

It is a still further object of the present invention to provide a pivotal idler frame assembly for conveyors which is capable of providing means for mounting and dismounting an entire idler frame assembly from a conveyor frame.

Additionally, it is an object of the present invention to provide a pivotal idler frame assembly for conveyors which provides means for repairing or replacing one or more rollers of the idler frame assembly without encountering the inherent dangers or risks associated with an accidental start-up of the conveyor.

Consistent with the foregoing objects, and in accordance with the invention as embodied and broadly described herein, a pivotal idler frame assembly for conveyors is disclosed in one embodiment of the present invention as including an idler frame assembly selectively disposed in a pivotal relationship to a stationary conveyor frame. The idler frame assembly consists of a hinge member rotatably engaging at least two fixation members of the idler frame assembly and at least two support flanges of the conveyor frame being correspondingly disposed in alignment with the fixation members. By means of releasing the operable engagement of a stabilizer member, the idler frame assembly may be pivoted in relation to the conveyor frame to remove the rollers of the idler frame assembly from communication with a moving member. In addition, the hinge member provides means for slideably removing the idler frame assembly from beneath the moving member and adjacent the conveyor frame to expose the rollers of the idler frame assembly or the idler frame for service.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 2:
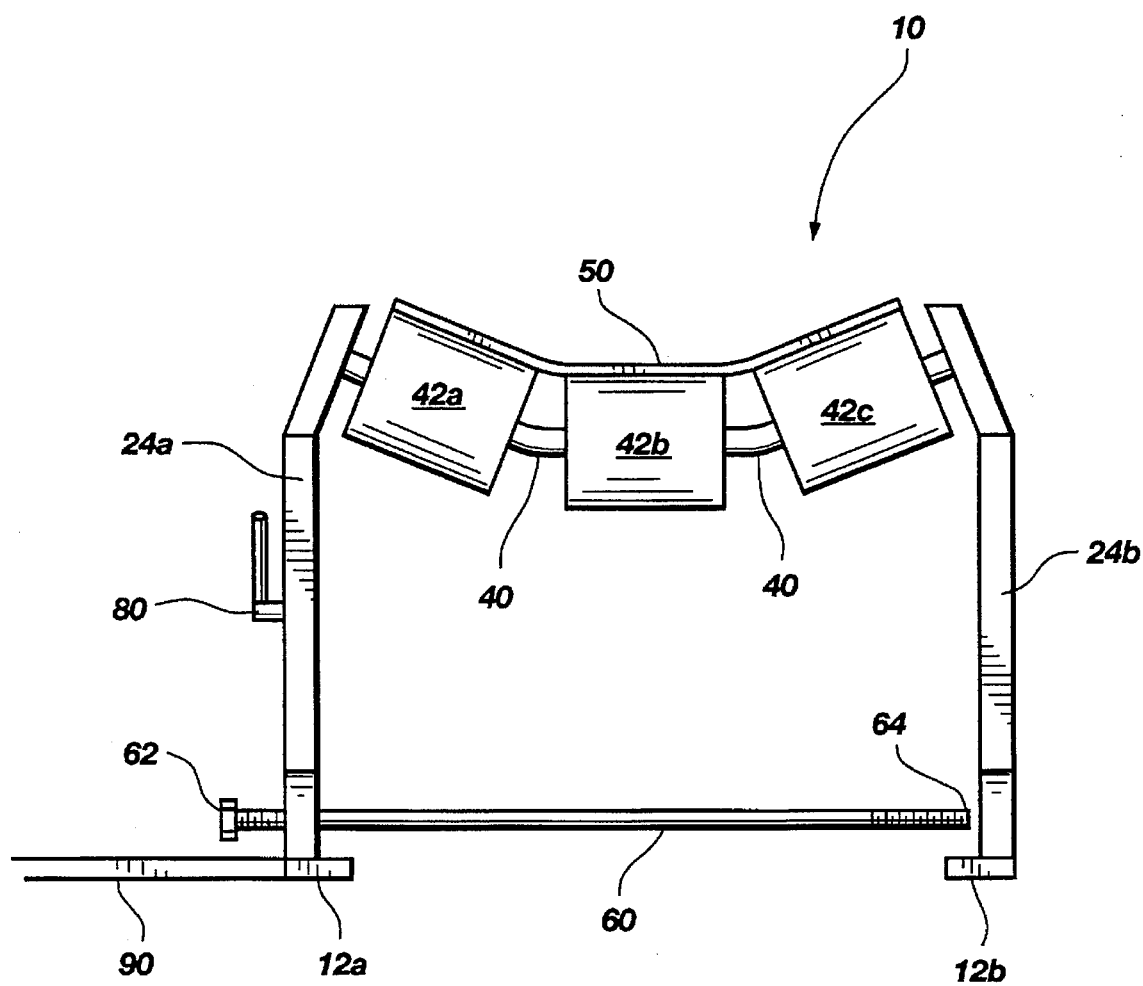
FIG. 2 is a side view of one presently preferred embodiment of the pivotal idler frame assembly for conveyors as shown in FIG. 1.
Figure 3:
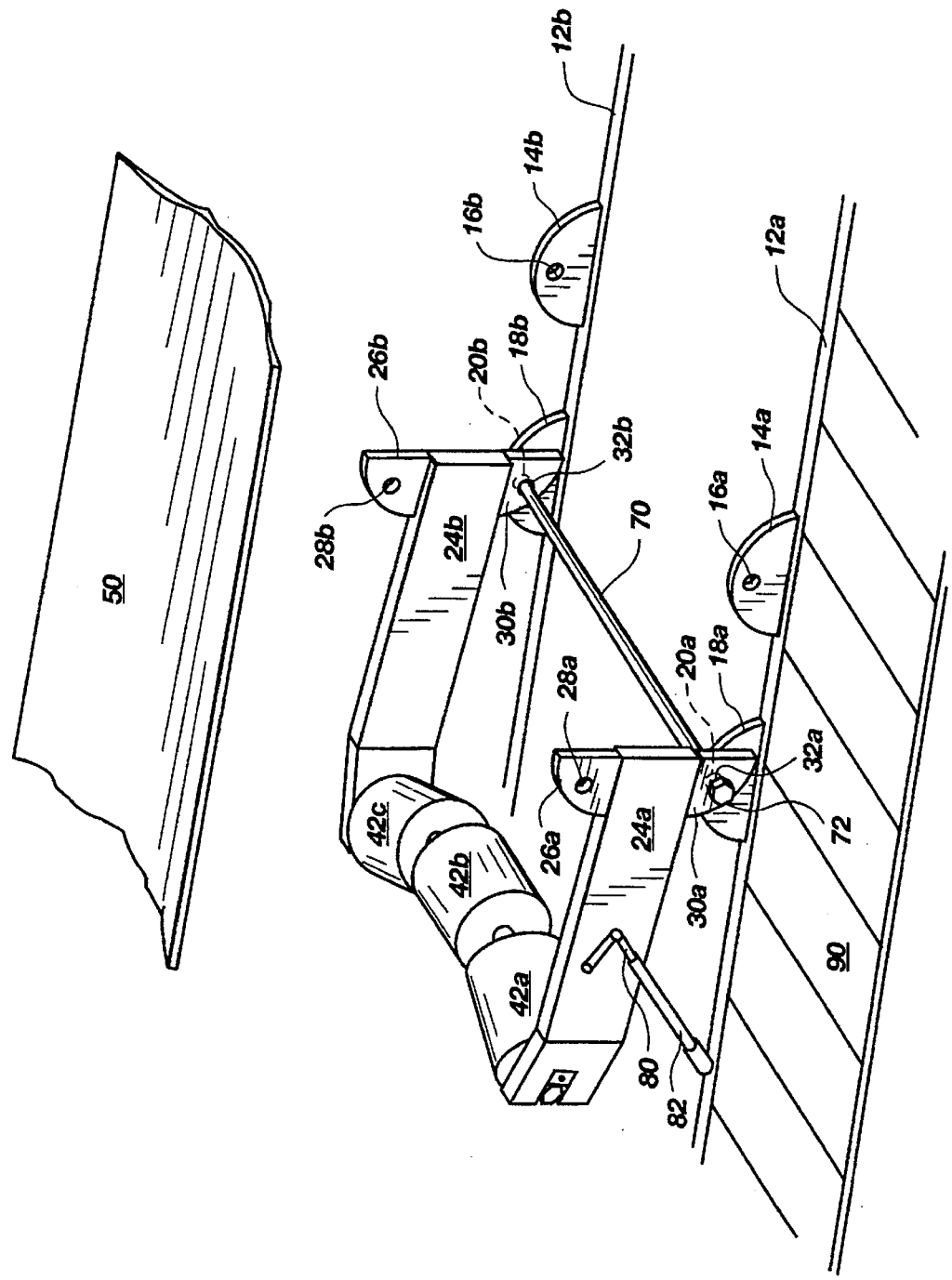
FIG. 3 is a perspective view illustrating one presently preferred embodiment of the idler frame assembly for conveyors of the present invention being shown in a pivotal position for exposing the rollers of the idler frame.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 3, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
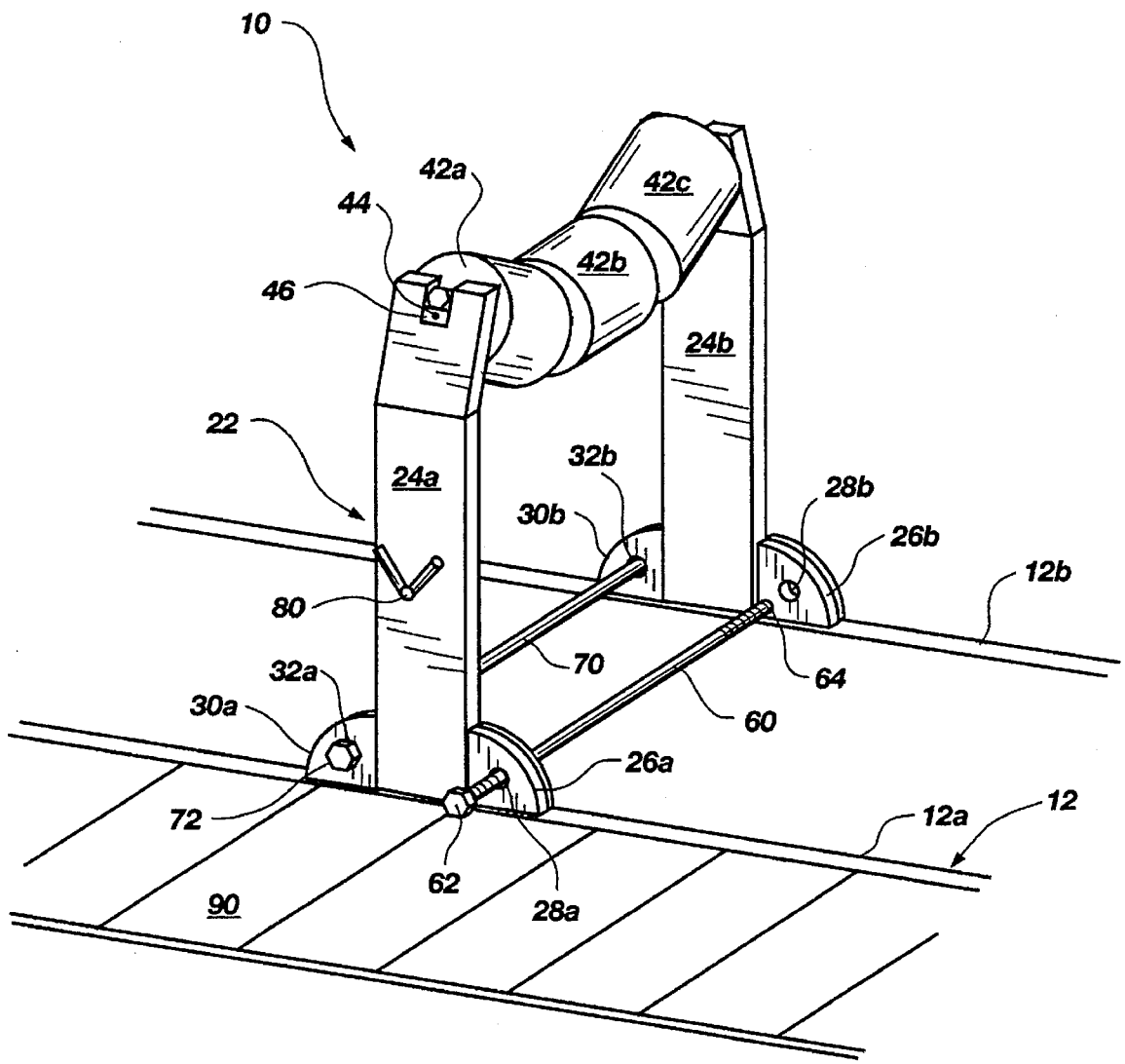
FIG. 1 is a perspective view of a pivotal idler frame assembly for a conveyor in accordance with one presently preferred embodiment of the present invention.

One presently preferred embodiment of the pivotal idler frame assembly for conveyors of the present invention, designated generally at 10, is illustrated in FIG. 1. As shown in FIGS. 1 through 3, the pivotal idler frame assembly for conveyors 10 comprises an idler frame assembly 22 removably engaging a stationary conveyor frame 12. The idler frame assembly 22 consists of a hinge member 70 rotatably engaging at least two fixation members 30a, 30b of the idler frame assembly 22 and at least two support flanges 18a, 18b of the conveyor frame disposed in alignment with the fixation members 30a, 30b. By means of releasing the operable engagement of a stabilizer member 60, the idler frame assembly 22 may be pivoted in relation to the conveyor frame 12 to selectively remove the rollers 42a, 42b, 42c of the idler frame assembly 22 from communication with a moving member 50. In addition, the hinge member 70 provides means for slideably removing the idler frame assembly 22 from beneath the moving member 50 and adjacent the conveyor frame 12 to expose the rollers 42a, 42b, 42c of the idler frame assembly 22 for service.

The conveyor frame 12 or main frame includes a first longitudinal member 12a and a second longitudinal member 12b operably disposed in parallel relation to each other. The longitudinal members 12a, 12b are preferably formed of a substantially rigid material to provide sufficient structural support to one or more idler frames 22 mounted thereon. In preferred construction, the longitudinal members 12a, 12b of the conveyor frame 12 are formed of metal or a metal alloy such as, for example, iron or steel. The longitudinal members 12a, 12b of the conveyor frame 12 can, of course, be formed of a wide variety of other suitable materials sufficiently sturdy to provide structural support to one or more idler frames 22.

In operation, the longitudinal members 12a, 12b of the conveyor frame 12 may be disposed horizontally, inclined, declined or substantially vertical in arrangement. When the longitudinal members 12a, 12b of the conveyor frame 12 are disposed in a substantially vertical arrangement, the steepness of the vertical disposition of the longitudinal members 12a, 12b may be limited by an angular slant at which the transported objects or materials begin to slide down the moving member 50 such as, for example, a conveyor belt preferably formed of canvas, rubber-impregnated cotton duck, or a thin, flat band of steel.

As best shown in FIG. 3, the first longitudinal member 12a of the conveyor frame 12 consist of at least two support flanges 14a, 18a. Preferably formed having a generally arcuate shape, a first support flange 14a and a second support flange 18a are fastened to the body of the first longitudinal member 12a and preferably extend substantially outward therefrom and substantially perpendicular thereto. It will be readily appreciated by those skilled in the art, however, that other shapes or configurations of support flanges 14a, 18a are possible.

Integrally formed within the periphery of the first support flange 14a is a through-bore 16a. The through-bore 16a is preferably formed having an internal diameter sufficient to allow an elongated stabilizer member 60 to be introduced therethrough, as illustrated in FIGS. 1 and 2. In similar design, integrally formed within the periphery of the second support flange 18a is a through-bore 20a. The through-bore 20a is preferably formed having an internal diameter sufficient to allow an elongated hinge member 70 to be operably disposed therethrough, as best illustrated in FIG. 3.

In spaced apart relationship to the first longitudinal member 12a, the second longitudinal member 12b of the conveyor frame 12 consist of at least two support flanges 14b, 18b. Substantially consistent in configuration with the general arcuate shape of the support flanges 14a, 18a of the first longitudinal member 12a, a first support flange 14b and a second support flange 18b are secured to the body of the second longitudinal member 12b in operable alignment with support flanges 14a, 18a, respectively. In addition, the support flanges 14b, 18b extend substantially outward and substantially perpendicular to the plane of the second longitudinal member 12b. It will be readily appreciated, however, that other shapes or configurations of the support flanges 14b, 18b are possible.

Integrally formed within the periphery of the first support flange 14b of the second longitudinal member 12b is a through-bore 16b. The through-bore 16b is preferably formed having an internal diameter sufficient to allow the elongated stabilizer member 60 to be introduced therein, as best illustrated in FIGS. 1 and 2. In similar design, integrally formed within the periphery of the second support flange 18b is a through-bore 20b. The through-bore 20b is preferably formed having an internal diameter sufficient to allow the elongated hinge member 70 to be disposed therein, as shown in FIG. 3.

Removably engaging the support flanges 14a, 18a of the first longitudinal member 12a and the support flanges 14b, 18b of the second longitudinal member 12b of the conveyor frame 12 is an idler frame assembly 22 or support frame. As FIG. 1 illustrates, the idler frame assembly 22 comprises two opposing support arms 24a, 24b disposed in parallel relation to each other and preferably projecting substantially perpendicular to the conveyor frame 12. The support arms 24a, 24b of the idler frame assembly 22 are formed of a sufficiently rigid material which provides the necessary structural support for maintaining one or more rollers 42 in mounted correlation therewith. In current design, the support arms 24a, 24b of the idler frame assembly 22 are preferably formed of metal or a metal alloy such as, for example, iron or steel. As will be appreciated by those skilled in the art, however, the support arms 24a, 24b of the idler frame assembly 22 may be formed of other suitable materials. For example, wood, fiberglass, ceramic, any of numerous organic, synthetic or processed materials that are mostly thermoplastic or thermosetting polymers of high molecular weight, graphitic steel or other suitable composite materials are possible.

In one presently preferred embodiment of the pivotal idler frame assembly 10 of the present invention, a first support arm 24a of the idler frame assembly 22 includes at least two fixation members 26a, 30a. The fixation members 26a, 30a are formed having a configuration which substantially compliments the cross-sectional periphery of the adjacent support flanges 14a, 18a, respectively. Fastened near an end opposite one or more rollers 42a, 42b, 42c supportably mounted on the idler frame assembly 22, the fixation members 26a, 30a preferably extend substantially outward on opposite sides of the first support arm 24a.

Integrally formed within the periphery of the first fixation member 26a is an aperture 28a. The aperture 28a is preferably formed having an internal diameter sufficient to allow the stabilizer member 60 to be introduced therethrough, as illustrated in FIGS. 1 and 2. In similar design, integrally formed within the periphery of the second fixation member 30a is an aperture 32a. The aperture 32a is preferably formed having an internal diameter sufficient to allow the hinge member 70 to be operably disposed therethrough, as best illustrated in FIG. 3.

In spaced apart relation to the first support arm 24a, a second support arm 24b of the idler frame assembly 22 is preferably formed having of at least two fixation members 26b, 30b. Consistent in configuration with the general shape of the fixation members 26a, 30a, a first fixation member 26b and a second fixation member 30b are fastened near an end opposite one or more rollers 42a, 42b, 42c supportably mounted on the idler frame assembly 22 and preferably extend substantially outward on opposite sides of the second support arm 24b.

Preferably, an aperture 28b is integrally formed within the periphery of the first fixation member 26b of the second support arm 24b. The aperture 28b is preferably formed having an internal diameter sufficient to allow the elongated stabilizer member 60 to be introduced therethrough, as illustrated in FIGS. 1 and 2. In similar design, integrally formed within the cross-sectional periphery of the second fixation member 30b is an aperture 32b. The aperture 32b is preferably formed having an internal diameter sufficient to allow the hinge member 70 to be operably disposed therethrough, as best illustrated in FIG. 3.

As illustrated in FIG. 2, structurally supported by support arms 24a, 24b and operably disposed at an end opposite the fixation members 26a, 26b, 30a, 30b of the idler frame assembly 22, a mounting member 40 is formed having conventional engagement openings formed on opposing sides of one or more conventional rollers 42a, 42b, 42c to provide means for removably retaining the rollers 42a, 42b, 42c in rotatable engagement therewith. In present construction, the mounting member 40 comprises means for removably retaining at least three rollers 42a, 42b, 42c preferably forming a trough conformation for supporting, transferring motion or guiding a conventional moving member 50. Similarly, the axis of the first roller 42a and the third roller 42c defines a substantially complimentary plane, which may have a slight inclination relative to a horizontal plane. Preferably, the axis of the second roller 42b defines a substantially horizontal plane relative to the first and third rollers, thereby providing a respective trough configuration for retaining objects or materials transported by the moving member 50 such as, for example, a conventional conveyor belt. It will be readily appreciated by those skilled in the art, however, that one or more rollers 42 may be removable retained by the mounting member 40 and disposed or aligned in other configurations or shapes which are consistent with the spirit and scope of the present invention.

In one presently preferred embodiment of the idler frame assembly 10 of the present invention, the stabilizer member 60 removably engages both the idler frame assembly 22 and the conveyor frame 12 and preferably stabilizes the connection therebetween. In current design, the stabilizer member 60 is preferably formed of metal or metal alloy such as, for example, iron or steel. As will be appreciated by those skilled in the art, however, the stabilizer member 60 may be formed of other suitable materials, for example, wood, fiberglass, ceramic, any of numerous organic, synthetic or processed materials that are mostly thermoplastic or thermosetting polymers of high molecular weight, graphitic steel or any other suitable composite materials.

Preferably formed having a substantially cylindrical shape, the stabilizer member 60 includes a diameter sufficient in cross-sectional area for being rotatably introduced into fixation members 28a, 28b and support flanges 14a, 14b by means of a threaded engagement therebetween. In one presently preferred embodiment of the present invention, a second end 64 of the stabilizer member 60 is rotatably introduced into the aperture 28a disposed in the first fixation member 26a of the first support arm 24a of the idler frame assembly 22 and further inserted through the corresponding through-bore 16a disposed in the first support flange 14a of the first longitudinal member 12a of the conveyor frame 12. Correspondingly, the second end 64 of the stabilizer member 60 is then passed transverse dimensionally across the body of the idler frame assembly and rotatably introduced into the aperture 28b disposed in the first fixation member 26b of the second support arm 24b and then introduced rotatably into the through-bore 16b disposed in the first support flange 14b of the second longitudinal member 12b. Since the outer periphery of the stabilizer member 60 of the present invention must operably conform to the internal diameter of the apertures 28a, 28b of the fixation members 26a, 26b, respectively, and the internal diameter of the through-bores 16a, 16b of the support flanges 14a, 14b, respectively, it is anticipated that the internal diameter of the various openings thereof may be formed in a series of various sizes or configurations being sufficient to accommodate the outer periphery of the stabilizer member 60, or vice versa in structural relationship.

As the second end 64 of the stabilizer member 60 is being rotatably introduced through the aperture 28b of the fixation member 26b and into the through-bore 16b of the support flange 14b, a first threaded end 62 of the stabilizer member 60 is rotatably introduced correspondingly into the aperture 28a of the fixation member 26a and through the through-bore 16a of the support flange 14a. In preferred construction, the stabilizer member 60 consists of a head portion rigidly fixed at the first end 62 of the stabilizer member 60 to provide means for interacting with a tool such as, for example, a ratchet, for rotating the stabilizer member 60 in operable engagement or disengagement with the idler frame assembly 22 and the conveyor frame 12.

In an alternate embodiment, a retaining member (not shown) may be provided which is secured to the body of the first fixation member 26b of the second longitudinal member 12b and disposed in alignment with the aperture 28b. For example, a retaining member may be provided having a relatively short cylindrical body defining a conduit or channel comprising an internal diameter sufficient to introduce the threaded portion of the second end 64 of the stabilizer member 60 therein. In view of the assortment of retaining members available, those skilled in the art will readily recognize other possible modifications and adaptations which are consistent with the spirit and scope of the present invention.

In similar construction of one presently preferred embodiment of the stabilizer member 60 of the present invention, the hinge member 70 removably engages both the idler frame assembly 22 and the conveyor frame 12 whereby providing means for pivoting the idler frame assembly 22 in relation to the conveyor frame 12. The hinge member 70 is preferably formed of metal or a metal alloy such as, for example, iron or steel. As will be appreciated, however, the hinge member 70 may be formed of other suitable materials, for example, wood, fiberglass, ceramic, and of numerous organic, synthetic or processed materials that are mostly thermoplastic or thermosetting polymers of high molecular weight, graphitic steel or any other suitable composite materials.

In current design, the hinge member 70 is substantially cylindrical in shape having a diameter sufficient for being rotatably introduced into fixation members 30a, 30b and support flanges 18a, 18b by means of a threaded engagement therebetween. In one presently preferred embodiment of the present invention, the hinge member 70 is rotatably introduced into the aperture 32a disposed in the first fixation member 30a of the first support arm 24a of the idler frame assembly 22 and further inserted into the corresponding through-bore 20a disposed in the first support flange 18a of the first longitudinal member 12a of the conveyor frame 12. Correspondingly, the elongated body of the hinge member 70 is passed transverse dimensionally across the body of the idler frame assembly 22 and rotatably introduced into the aperture 32b disposed in the first fixation member 30b of the second support arm 24b and then introduced rotatably into the through-bore 20b disposed in the first support flange 18b of the second longitudinal member 12b. Since the outer periphery of the hinge member 70 of the present invention must operably conform to the internal diameter of the apertures 32a, 32b of the fixation members 30a, 30b, respectively, and the internal diameter of the through-bores 20a, 20b of the support flanges 18a, 18b, respectively, it is anticipated that the internal diameter of the various openings thereof may be formed in a series of different sizes or configurations sufficient to accommodate the outer periphery of the hinge member 70, or vice versa in structural relationship.

As the distal end of the hinge member 70 is being rotatably introduced through the aperture 32b of the fixation member 30b and into the through-bore 20b of the support flange 18b, a proximate end of the hinge member 70 may be rotatably introduced correspondingly into the aperture 32a of the fixation member 30a and through the through-bore 20a of the support flange 18a. In preferred construction, the hinge member 70 comprises a head portion rigidly fixed at the proximate end of the hinge member 70 to provide means for interacting with a locking member 72 such as, for example, a lock nut, for releasably engaging the hinge member 70 in operable engagement or disengagement with the idler frame assembly 22 and the conveyor frame 12, as illustrated in FIG. 1.

In an alternate embodiment, a retaining member (not shown) may be provided which is secured to the body of the fixation member 30b of the second longitudinal member 12b and disposed in alignment with the aperture 32b. For example, a retaining member may be provided having a relatively short substantially cylindrical body defining an internal channel of conduit comprising a cross-sectional area sufficient to introduce the threaded portion of the distal end of the hinge member 70 rotatably therein. In view of the assortment of retaining members available, those skilled in the art will readily recognize other possible modifications and adaptations which are consistent with the spirit and scope of the present invention.

A presently preferred method for mounting or dismounting one or more rollers 42a, 42b, 42c from the idler frame assembly 22 comprises the step of rotatably removing the stabilizer member 60 from its stabilizing engagement with the idler frame assembly 22 and the conveyor frame 12. In preferred operation, the stabilizer member 60 may be rotated in a counter-clockwise manner by means of an interactive tool such as, for example, a ratchet, applied to the head portion of the first end 62 of the stabilizer member 60 and rotated to release the threaded engagement therebetween. After releasing the stabilizer bar 60 from its engagement with the fixation members 26a, 26b of the idler frame assembly 22 and the support flanges 14a, 14b of the conveyor frame 12, the stabilizer member 60 is selectively removed from its engagement with the idler frame 22 and the conveyor frame 12.

After removing the elongated stabilizer member 60, the idler frame assembly 22 may be pivotally rotated by means of a pivotal engagement between the fixation members 30a, 30b of the idler frame 22 and the hinge member 70, thus providing means for selectively removing the rollers 42a, 42b, 42c from communication with the moving member 50 (e.g., conveyor belt). As shown in FIG. 3, in one presently preferred embodiment of the present invention, the support arm 24a of the idler frame assembly 22 consists of a tilt assembly 80 formed having a substantially V-shaped configuration and providing a channel or conduit wherein a lever 82 such as, for example, a ratchet handle, bar or some other conventional member, may be introduced to assist in pivoting the idler frame assembly 22 in relation to the conveyor frame 12. It will be readily appreciated, however, that other shapes or configurations of the tilt assembly 80 are possible.

In one presently preferred method of the present invention, the locking member 72 operably disposed in contact with the proximate end of the hinge member 70 may be removed to allow the idler frame assembly 22 to be slidably exposed from beneath the moving member 50 on the hinge member 70. Preferably, the locking member 72 comprises a locking nut disposed in threaded relationship with the proximate end of the hinge member 70. Correspondingly, upon removal of the locking member 72, the idler frame assembly 22 may be pulled outward from beneath the moving member 50 and adjacent a catwalk 90 along the elongated body of the hinge member 70. In this manner, the idler frame assembly 22 is exposed from beneath the moving member 50 adjacent the catwalk 90 for the purpose of mounting or dismounting the rollers 42a, 42b, 42c of the idler frame assembly 22 within a matter of seven to ten minutes with the assistance of only one technician. The pivoted idler frame assembly 22 may be supported by a bracing member adjacent the conveyor frame 12a on the catwalk for easy servicing of the rollers 42a, 42b, 42c.

Rotatably retaining the rollers 42a, 42b, 42c in mounted engagement with the idler frame assembly 22, a roller pin 44 and a retaining member 46 are preferably disposed on opposing sides of the rollers 42a, 42b, 42c to removably retain the rollers 42a, 42b, 42c in rotatable cooperation with the mounting member 40. To dismount the rollers 42a, 42b, 42c from their engagement with the mounting member 40 of the idler frame assembly 22, the conventional roller pins 44 are removed whereby providing means for releasing the retaining member 46 from engagement with the opposing ends of the rollers. In this manner, rollers 42a, 42b, 42c may be dislodged from the respective engagement openings of the mounting member 40 of the idler frame assembly 22 for repair or replacement. In operation, the roller pin 44 and retaining member 46 disposed on the side adjacent support arm 24b can be easily exposed and removed on the catwalk 90 without sacrificing the safety of the worker.

If the idler frame assembly 22 is to be replaced, the hinge member 70 is rotatably removed from its engagement with the idler frame assembly 22 and the conveyor frame 12. Accordingly, the old idler frame assembly 22 is slidably removed from its pivotal engagement with the hinge member 70 and a replacement idler frame assembly 22 is then mounted by means of introducing the hinge member 70 into the fixation members 30a, 30b and slidably introduced and pivoted back into a position to engage the moving member 50 and be interlocked with the conveyor frame 12 by means of introducing the stabilizer bar 60 into an operable engagement therewith.

As will be readily appreciated by those skilled in the art, the foregoing steps may be reversed to mount one or more rollers 42 in rotatable engagement with the mounting member 40 and for pivoting the idler frame assembly 22 in working relation with the moving member 50 and the conveyor frame 12.

In view of the novel structural features of the idler frame assembly 10, one presently preferred method of the present invention provides means for mounting and/or dismounting at least one roller 42 from the idler frame assembly 22 in approximately seven to ten minutes with the assistance of only one technician. Further to the foregoing, both continuous and intermittently moving equipment are contemplated by the present invention.

From the above discussion, it will be appreciated that the present invention provides an idler frame assembly for conveyors having a hinge mechanism which is capable of providing means for pivotally displacing the idler frame from contact with a conveyor belt for the repair or replacement of one or more rollers of the idler frame without encountering the dangers or risks associated with an accidental start-up of the conveyor. Unlike prior art materials-handling conveyor assemblies, the present invention provides a pivotal idler frame assembly for conveyors having a hinge member which is capable of providing a slidable means for simultaneously exposing one or more rollers of the idler frame from beneath a conveyor belt for repair or replacement.

Additionally, the present invention provides a pivotal idler frame assembly for conveyors which substantially reduces the time and labor involved to service one or more rollers of the idler frame assembly, while maintaining meaningful safety standards. Moreover, the present invention provides a pivotal idler frame assembly for conveyors which is capable of providing means for removing an entire idler frame from the conveyor frame.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A conveyor having an idler frame assembly comprising:
   a main frame;
   a support frame supporting at least one removable roller, said support frame removably engaging said main frame;
   a stabilizing member removably engaging said support frame and said main frame, said stabilizing member extending widthwise across and in between said support frame and said main frame; said stabilizing member includes two opposite ends, wherein each of said opposite ends connect said support frame and said main frame and said main frame together;
   a member for moving objects, said moving member being selectively disposed in operable communication with said roller; and
   means for pivoting said support frame in relation to said main frame to displace said roller from said operable communication with said moving member.

2. A conveyor having an idler frame assembly as defined in claim 1 wherein said main frame comprises a first longitudinal member and a second longitudinal member operably disposed in parallel relationship to said first longitudinal member.

3. A conveyor having an idler frame assembly as defined in claim 1 wherein said support frame consists of at least three rollers.

4. An idler frame assembly for conveyors as defined in claim 3 wherein said rollers are disposed in a trough configuration.

5. A conveyor having an idler frame assembly as defined in claim 1 wherein said moving member comprises a conventional conveyor belt.

6. A conveyor having an idler frame assembly as defined, in claim 1 wherein said means for pivoting said support frame in relation to said main frame comprises a hinge member.

7. A conveyor having an idler frame assembly as defined in claim 6 wherein said hinge member extends transverse dimensionally across said support frame.

8. A conveyor having an idler frame assembly as defined in claim 6 wherein said hinge member comprises a locking member releasably retaining the hinge member in operable engagement with said support frame and said main frame.

9. A conveyor having an idler frame assembly as defined in claim 1 wherein said stabilizing member comprises a substantially cylindrical configuration.

10. A conveyor having an idler frame assembly as defined in claim 7 wherein said hinge member comprises a substantially cylindrical configuration.

11. A conveyor having an idler frame assembly comprising:
   a conveyor frame;
   support frame supporting at least one removable roller, said support frame removably engaging said conveyor frame;
   member for moving objects, and moving member being selectively disposed in operable communication with said roller;
   a stabilizing member removably engaging said support frame and said conveyor frame, said stabilizing member extending widthwise across and in between; said support frame and said conveyor frame; said stabilizing member includes two opposite ends, wherein each of said opposite ends connects said support frame and said main frame together;
   a hinge member for pivoting said support frame in relation to said conveyor frame to selectively displace said roller from communication with said moving member, said hinge member further providing means for slideably exposing said support frame from beneath said moving member, wherein said hinge member extends widthwise across and in between said support frame.

12. A conveyor having an idler frame assembly as defined in claim 11 wherein said conveyor frame comprises a first longitudinal member and a second longitudinal member operably disposed in parallel relationship to said first longitudinal member.

13. A conveyor having an idler frame assembly as defined in claim 11 wherein said support frame comprises at least two support arms engaging a mounting member.

14. A conveyor having an idler frame assembly as defined in claim 11 wherein said support frame comprises at least three rollers.

15. A conveyor having an idler frame assembly as defined in claim 14 wherein said rollers are disposed in a trough configuration.

16. A conveyor having an idler frame assembly as defined in claim 11 wherein said hinge member further comprises a locking member releasably retaining the hinge member in operable engagement with said support frame and said conveyor frame.

17. A method for servicing or replacing a roller of a support frame, comprising the steps of:
   removing a stabilizing member egageably disposed between said support frame and a main frame, said stabilizing member extending widthwise across and is between the support frame and said main frame; said stabilizing member includes two opposite ends, wherein each of said opposite ends connects said support frame and said main frame together.
   pivoting said support frame in relation to said main frame in order to displace said roller from communication with a moving member;
   slideably exposing said roller of said support frame from beneath said moving member; and
   servicing said roller.

18. A method for servicing or replacing a roller of a support frame as defined in claim 17 wherein said step for slideably exposing said roller of said support frame comprises a hinge member, said hinge member extending widthwise across and in between said support frame and providing means for supporting said support frame in slideable association therewith.

* * * * *

UNITED STATES PATENT AND TRADEMARK OFFICE
CERTIFICATE OF CORRECTION

PATENT NO. : 5,657,857
DATED : August 19, 1997
INVENTOR(S) : Marvin C. Neilson, et al.

It is certified that error appears in the above-indentified patent and that said Letters Patent is hereby corrected as shown below:

Column 11, line 30, after the word "frame", please delete the words -- and said main frame --.

Column 11, line 45, please delete "An idler frame assembly for conveyors, and insert therefor -- A conveyor having an idler frame assembly --.

Column 11, line 51, after the word "defined", please delete -- , --

Column 12, line 12, after the word "between", please delete -- ; --

Column 12, line 48, please delete "is", and insert therefor -- in --.

Signed and Sealed this

Twenty-eighth Day of October, 1997

Attest:

BRUCE LEHMAN

Attesting Officer

Commissioner of Patents and Trademarks